United States Patent [19]
Whitson et al.

[11] Patent Number: 5,359,761
[45] Date of Patent: Nov. 1, 1994

[54] METHOD OF MAKING A HEADER OR HOUSING FOR ELECTRICAL CONNECTION TO A HYBRID CIRCUIT INCLUDING AN IN-CAVITY TRIM OF A TERMINAL FRAME

[75] Inventors: Duane E. Whitson, Amboy; Daniel A. Lawlyes, Cicero, both of Ind.

[73] Assignee: Delco Electronics Corp., Kokomo, Ind.

[21] Appl. No.: 118,546

[22] Filed: Sep. 9, 1993

[51] Int. Cl.⁵ .......................................... H01R 43/00
[52] U.S. Cl. ........................................ 29/883; 29/418; 29/874; 29/884; 29/566.2; 425/127; 425/129.1; 425/553
[58] Field of Search ............... 29/418, 883, 884, 874, 29/566.1, 566.2; 72/326; 83/176; 425/127, 129.1, 291, 292, 296, 297, 308–310

[56] References Cited

U.S. PATENT DOCUMENTS

| | | |
|---|---|---|
| 3,396,461 | 8/1968 | Spooner et al. ................ 29/418 |
| 4,854,041 | 8/1989 | Saito et al. .................... 29/622 |
| 5,065,501 | 11/1991 | Henschen et al. ............. 29/418 |
| 5,193,592 | 3/1993 | Evilsizer et al. ............. 140/123.6 |
| 5,274,918 | 1/1994 | Reed ............................. 29/882 |

OTHER PUBLICATIONS

Doug Smock, Secondary Operations—Unique system uses press motion as punch and die, PW News Analysis, Plastic World/Sep. 1992, p. 10.

*Primary Examiner*—P. W. Echols
*Attorney, Agent, or Firm*—Cary W. Brooks; Mark A. Navarre

[57] ABSTRACT

The present invention relates to a method of making a header or housing for connection to a semi-conductor device including the step of trimming a single terminal frame molded into the header while the header or housing is in the molding cavity. To accomplish this, the present invention utilizes a single terminal frame including a plurality of substantially parallel electrical connection fingers held together at one end by a tie-bar. The terminal frame has a "V-notch" in each of the electrical connection fingers at a location adjacent the tie-bar. The terminal frame is placed in a mold having an upper and lower mold shell each having cavities formed therein which together define the header or housing to be molded. The upper and lower mold shells come together and grasp the terminal frame at a position adjacent the notch and so that the tie-bar extends outwardly from the upper and lower mold shells. The molding apparatus includes a trim punch positioned to advance towards the tie-bar so that the terminal frame bends at the location of the notch and the tie-bar is eventually torn away from the electrical connection fingers. The tie-bar may be trimmed from the terminal frame either before or after the plastic material is injected into the molding cavity and solidified to form the plastic header or housing.

4 Claims, 1 Drawing Sheet

METHOD OF MAKING A HEADER OR HOUSING FOR ELECTRICAL CONNECTION TO A HYBRID CIRCUIT INCLUDING AN IN-CAVITY TRIM OF A TERMINAL FRAME

FIELD OF THE INVENTION

The present invention relates to a method of making a header or housing for electrical connection to a hybrid circuit including the step of trimming a header terminal frame in the mold cavity.

BACKGROUND OF THE INVENTION

It is quite common for semi-conductor devices, such as a hybrid circuit formed on a ceramic substrate, to be enclosed in a plastic molded housing. The housing includes a header portion having electrical connection pins made from a terminal frame molded therein. Wire-bonds are connected from one end of the electrical connection pins to contact pads or electrical leads of a hybrid circuit. The other end of the electrical connection pins extend out of the housing and header for connection to an external source in a manner known to those skilled in the art.

Heretofore, the header has been formed using a single-piece terminal frame including a plurality of parallel electrical connection fingers connected together along one end by a tie-bar. In such an operation, the single-piece terminal frame is placed in the mold cavity and directly molded into the header for the housing of the semi-conductor device. When the frame is placed in the mold, the tie-bar and a portion of each of the electrical connection fingers are positioned so that they will not be surrounded by the plastic of the header or housing. Once the header is molded around a portion of the electrical connection fingers, the housing is removed from the mold. Thereafter, the tie-bar portion of the terminal frame is punched and removed. After removing the tie-bar, the header then has a plurality of individual electrical connection pins available for connection to an external source. Thus, under this method of making the semi-conductor housing and header, additional tooling and additional steps are required to punch the terminal frame and remove the tie-bar. Further, punching the terminal frame to remove the tie-bar results in substantial wear to the punch tooling which must be frequently replaced.

Thus, heretofore there has been a need for a simple method of making a housing or header for connection to a semi-conductor device including trimming the terminal frame molded into the housing header.

SUMMARY OF THE INVENTION

The present invention relates to a method of making a header or housing for connection to a semi-conductor device including the step of trimming the single-piece terminal frame while the frame is still in the molding cavity. To accomplish this, the present invention utilizes a single terminal frame including a plurality of substantially parallel electrical connection fingers held together at one end by a tie-bar. The terminal frame has a "V-notch" or weak point in each of the electrical connection fingers at a location adjacent the tie-bar. The terminal frame is placed in a mold having an upper and lower mold shell and each having cavities formed therein which together define the header or housing to be molded. The upper and lower mold shells come together and grasp the terminal frame at a position adjacent the notch and so that the tie-bar extends outwardly from the upper and lower mold shells. The molding apparatus includes a trim punch positioned to advance towards the tie-bar so that the terminal frame bends at the location of the notch. The tie-bar is eventually torn away from the electrical connection fingers as the trim punch is further advanced. The tie-bar may be trimmed from the terminal frame either before or after the plastic material is injected into the molding cavity and solidified to form the plastic header or housing.

These and other features, objects, and advantages of the present invention will become apparent from the following brief description of the drawings, detailed description and appended claims and the drawings.

DETAILED DESCRIPTION

Figure 1:
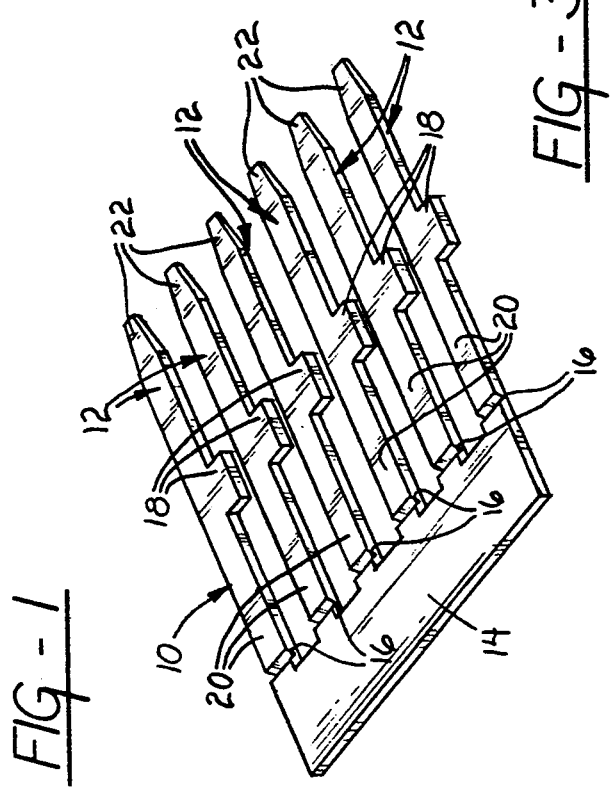
FIG. 1 illustrates a single-piece lead frame according to the present invention including a "V-notch"

FIG. 1 illustrates a single-piece metal terminal frame 10 according to the present invention. The terminal frame includes a plurality of substantially parallel electrical connection fingers 12 held together at one end by a tie-bar 14 running perpendicular to each finger. Each of the electrical connection fingers has a weak point 16 or notch, preferably a "V-notch", adjacent the tie-bar and running parallel to the tie-bar. A "V-notch" may be made on the top and/or bottom faces of each of the electrical connection fingers. The electrical connection fingers may also include a projection 18 which helps to prevent the electrical connection fingers from being moved after they are molded into a header or housing. The surface 20 of the electrical connection finger adjacent the "V-notch" will serve as a paddle for wire bonding to a conductor pad or electrical lead of the hybrid circuit to be mounted to the header or housing. The other end 22 of the electrical connection finger will extend outwardly of the header or housing for making an electrical connection to an external source in a manner known to those skilled in the art.

Figure 2:
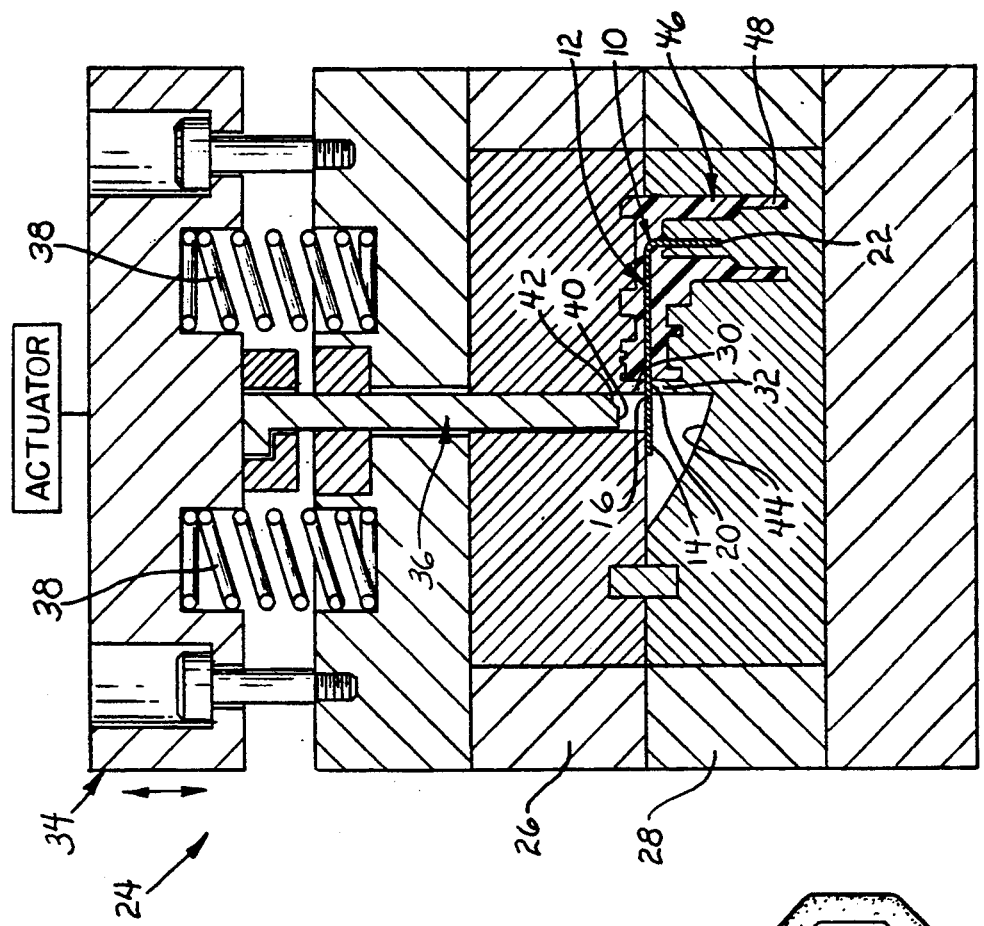
FIG. 2 illustrates a molding apparatus according to the present invention including an incavity terminal frame trimming tool.

FIG. 2 illustrates a molding apparatus 24 according to the present invention. The molding apparatus includes upper and lower molding shells 26, 28 having cavities formed therein which define the header 48 or housing 46 to be molded. The molding apparatus also includes a punch head 34 having a trim punch 36 secured thereto. Springs 38 secured to the upper mold shell 26 bias the punch head 34 away from the top shell. An actuator is connected to the punch head so that the trim punch 36 may be advanced toward the tie-bar 14 of the terminal frame. According to the present invention, the terminal frame 10 is placed between shoulders 30, 32 of upper and lower molding shells and held in position by the closed shells at a location on the electrical connection finger adjacent the "V-notch" and so that the tie-bar extends outwardly from the upper and lower mold shells. Once the lead frame is held in position by the upper and lower mold shell shoulders 30, 32, the trim punch 36 is advanced towards the tie-bar 14 so that the terminal frame bends at the location of the "V- notch" 16 and the tie-bar is eventually torn off as the trim punch is further advanced. The use of the "V-notch" allows the tie-bar to be torn off as opposed to be cut off. This prolongs the life of the trim punch tool.

The trim punch tool 36 may include at one end a substantially flat punch face 40 and an immediately adjacent angled punch face 42. The substantially flat face 40 first engages the top surface of the tie-bar. As the tie-bar is bent downward upon advancement of the trim punch, the adjacent angled face 42 of the trim punch further engages the tie-bar so that the tie-bar is eventually torn off as the trim punch is further advanced. The use of the combination of cutting faces of the trim punch results in prolonged tooling life. The molding apparatus may include a recess area 44 for receiving the tie-bar as it is torn off by the trim punch. Alternatively, the molding apparatus may include a passage to allow the tie-bar to fall to the ground as it is torn away from the electrical connection fingers.

The tie-bar may be trimmed from the electrical connection fingers either before or after plastic material is injected into the mold cavity to form the plastic header or housing for holding the semi-conductor device such as a hybrid circuit formed on a ceramic or other suitable substrate.

Figure 3:
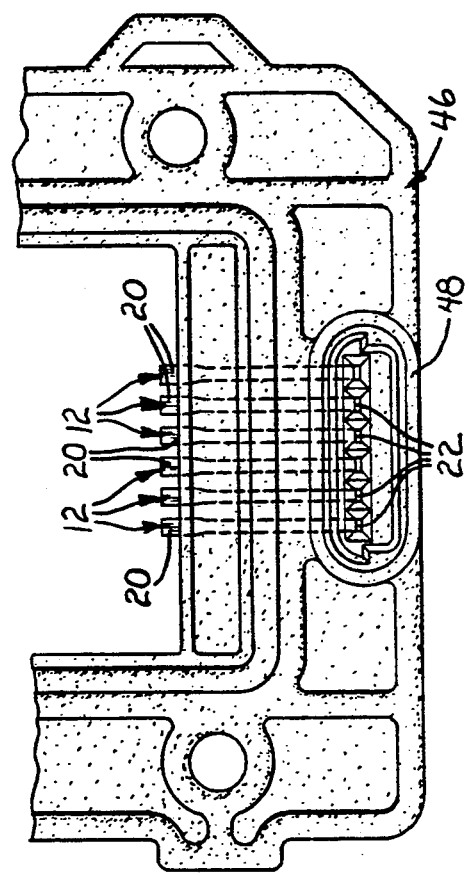
FIG. 3 illustrates a housing for holding a semi-conductor device including a header having a terminal frame with the tie-bar removed.

FIG. 3 illustrates a housing 46 for receiving a semiconductor device such as a hybrid circuit formed on a ceramic substrate. The housing includes a header 48 for making electrical connections to external sources. The header includes individual electrical terminal pins 12 formed by removing the tie-bar of a single-piece terminal frame which has been molded into the header.

The present invention provides a simple method of forming a header or housing for holding a semi-conductor device including the step of trimming a single-piece terminal frame while the terminal frame is in the molding apparatus. The use of a single-piece terminal frame having "V-notches" on upper and lower surfaces of the individual electrical connection fingers provides for the removal of the tie-bar by a trimming punch without excessive wear to the trimming tool.

The embodiments of the invention in which an exclusive property or privilege is claimed as defined as follows:

1. A method of making a device comprising:

placing a single-piece terminal frame having a plurality of substantially parallel electrical connection fingers held together at one end by a tie-bar and having a notch formed on a surface of each of the electrical connection fingers at a location adjacent the tie-bar;

closing upper and lower molding shells of a molding apparatus, each having cavities formed therein to partially define a header for mounting to a semiconductor device, and so that the upper and lower shells hold the single-piece terminal frame along a portion of the electrical connection fingers adjacent the notch and so that the tie-bar extends outwardly from the upper and lower mold shells;

advancing a trim punch held within the molding apparatus so that the terminal frame is bent by the trim punch at the notch, and further advancing the trim punch to tear the tie-bar off of the terminal frame at the location of the notch.

2. A method as set forth in claim 1 further comprising the step of injecting a plastic material into the molding cavity defined by the upper and lower mold shells and solidifying the plastic material to hold a portion of each of the electrical connection fingers and provide for exposed first and second ends of the fingers for connection to an external source and to a semi-conductor device mounted to the header, respectively.

3. A method as set forth in claim 2 wherein said top and bottom mold shells include cavities for defining a housing for mounting a substrate having a hybrid circuit formed thereon, and further comprising the steps of mounting a substrate having a hybrid circuit thereon in said housing, and electrically connecting the hybrid circuit to an electrical connection finger held by said header.

4. A method as set forth in claim 1 wherein said trim punch includes one end having a substantially flat engagement surface and an angled engagement surface immediately adjacent thereto, so that as the trim punch is advanced the flat engagement surface contacts the tie-bar first to bend the terminal frame at the notch, and as the trim punch is further advanced the angled surface of the trim punch engages the tie-bar and causes the tie-bar to be torn away from the electrical connector finger at the location where the notch existed.

* * * * *